US012436938B2

(12) United States Patent
Iqbal et al.

(10) Patent No.: US 12,436,938 B2
(45) Date of Patent: Oct. 7, 2025

(54) MULTI-TENANT TRANSACTIONAL OUTBOX PATTERN FOR EVENT PUBLISHING

(71) Applicant: Oracle International Corporation, Redwood Shores, CA (US)

(72) Inventors: Arif Iqbal, Fremont, CA (US); Suhas Madap, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/480,295

(22) Filed: Oct. 3, 2023

(65) Prior Publication Data

US 2025/0028703 A1 Jan. 23, 2025

Related U.S. Application Data

(60) Provisional application No. 63/514,991, filed on Jul. 21, 2023.

(51) Int. Cl.
*G06F 16/23* (2019.01)
(52) U.S. Cl.
CPC ...... *G06F 16/2358* (2019.01); *G06F 16/2365* (2019.01)
(58) Field of Classification Search
None
See application file for complete search history.

(56) References Cited

U.S. PATENT DOCUMENTS

| 2020/0257700 A1* | 8/2020 | Xu | G06F 16/213 |
| 2021/0133178 A1* | 5/2021 | Holmes | G06F 16/2365 |
| 2023/0319054 A1* | 10/2023 | Hendrey | H04L 63/105 |
| | | | 726/4 |
| 2024/0045980 A1* | 2/2024 | Adeel | G06F 21/6218 |
| 2024/0152414 A1* | 5/2024 | Vo | G06F 9/542 |
| 2024/0184652 A1* | 6/2024 | Kunz | G06F 16/278 |

OTHER PUBLICATIONS

"Apache Kafka", Retrieved from https://en.wikipedia.org/wiki/Apache_Kafka, Retrieved on Jul. 6, 2023, pp. 1-4.
(Continued)

*Primary Examiner* — Scott A. Waldron
(74) *Attorney, Agent, or Firm* — Invoke

(57) ABSTRACT

Operations include initiating execution of an atomic transaction; receiving confirmation of execution of the atomic transaction; publishing a notification corresponding to the execution of the atomic transaction; receiving the notification corresponding to the execution of the atomic transaction; retrieving the information corresponding to the database transaction; and publishing an event based on the information corresponding to the database transaction. The atomic transaction comprises (a) executing a database transaction adding, modifying, or deleting a value in a database instance and (b) logging, to an event outbox associated with a particular tenant among multiple tenants, information corresponding to the database transaction. The notification comprises information that can be used to identify the event outbox storing the information corresponding to the database transaction.

18 Claims, 7 Drawing Sheets

(56) References Cited

OTHER PUBLICATIONS

"Pattern: Saga", Retrieved from https://microservices.io/patterns/data/saga.html, Retrieved on Jul. 6, 2023, pp. 1-5.
"Pattern: Transactional outbox", Retrieved from https://microservices.io/patterns/data/transactional-outbox.html, Retrieved on Jul. 6, 2023, pp. 1-3.
Morling G., "Five Advantages of Log-Based Change Data Capture", Jul. 19, 2018, Retrieved from https://debezium.io/blog/2018/07/19/advantages-of-log-based-change-data-capture/, pp. 1-4.

* cited by examiner

Time T1

Order table 302A

| Order ID | Item | Quantity | Cost Per Item | Total Cost |
|---|---|---|---|---|
|  |  |  |  |  |

Event outbox 304A

| EVENT ID | TARGET | DESCRIPTION |
|---|---|---|
|  |  |  |

Publisher notifications 306

| Notifications to event publisher |
|---|
|  |

External publication 308

| External message channel |
|---|
|  |

FIG. 3A

Time T2

Order table 302A

| Order ID | Item | Quantity | Cost Per Item | Total Cost |
|---|---|---|---|---|
| 234 | Widget | 2 | $10 | $20 |

Event outbox 304A

| EVENT ID | TARGET | DESCRIPTION |
|---|---|---|
| 12 | Order Table | Order Added |

Publisher notifications 306

| Notifications to event publisher |
|---|
| |

External publication 308

| External message channel |
|---|
| |

FIG. 3B

Time T3

Order table 302A

| Order ID | Item | Quantity | Cost Per Item | Total Cost |
|---|---|---|---|---|
| 234 | Widget | 2 | $10 | $20 |

Event outbox 304A

| EVENT ID | TARGET | DESCRIPTION |
|---|---|---|
| 12 | Order Table | Order Added |

Publisher notifications 306

| Notifications to event publisher |
|---|
| *Event outbox 304A of tenant A has new event* |

External publication 308

| External message channel |
|---|
| |

FIG. 3C

*Time T4*

Order table 302A

| Order ID | Item | Quantity | Cost Per Item | Total Cost |
|---|---|---|---|---|
| 234 | Widget | 2 | $10 | $20 |

Event outbox 304A

| EVENT ID | TARGET | DESCRIPTION |
|---|---|---|
| 12 | Order Table | Order Added |

Publisher notifications 306

| Notifications to event publisher |
|---|
| *Event outbox 304A of tenant A has new event* |

External publication 308

| External message channel |
|---|
| *New order 234 has been generated* |

FIG. 3D

MULTI-TENANT TRANSACTIONAL OUTBOX PATTERN FOR EVENT PUBLISHING

INCORPORATION BY REFERENCE; DISCLAIMER

The following application is hereby incorporated by reference: application No. 63/514,991, filed on Jul. 21, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to publishing transactions in a database occupied by multiple tenants served by a micro-service architecture.

BACKGROUND

Microservices and event driven architecture have recently been omnipresent in the industry due to their ability to meet the demands of improved manageability, resiliency, and scalability. To avoid the extra cost of distributed transaction protocols e.g., eXtended Architecture (XA), or two-phase commits, micro services have been relying on patterns like SAGA or transaction outbox pattern, for example.

There has been an additional rise of multi-tenant microservices architecture due to their ability to serve multiple tenant requests with minimal infrastructure cost along with providing the ability to scale on demand. In terms of the existing event publishing solutions like SAGA pattern or transaction outbox patterns, their application has been typically reduced to single tenant services, with significant deficiencies when it comes to multi-tenant microservices.

Multi-tenant microservices need to publish consistent business events reliably, resiliently, and in correct order. Since the messaging platforms normally do not participate in the microservice local transaction, several challenges exist in the conventional technology: local transaction can succeed, but message publish fails, or local transaction fails but message publish succeeds, or, for example, events from multiple local transactions need to be published in the same order as recorded in a database.

The existing technology encounters problems with multi-tenant microservices which need to interact with multiple databases or multiple schemas, because directly employing the presently available solutions in terms of setup and performance is a daunting task. An additional layer of complexity lies in the fact that multi-tenant microservices, in most cases, need to keep tenant data isolated at rest in their individual transaction data stores.

Specifically, the existing transactional outbox with message relay requires polling the outbox table at very low frequency on each tenant database or schema, rendering it therefore complex to setup. Moreover, the change data capture solution requires change data capture to be setup on each tenant database or schema, and it, similarly, causes excessive overhead due to its setup requirements. The SAGA choreography pattern further renders microservices more complex due to the requirement to have another SAGA orchestrator service with its own persistent storage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3D illustrate an example embodiment of the transactional publishing system;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TRANSACTION PUBLICATION ARCHITECTURE
3. MULTI-TENANT TRANSACTIONAL PUBLISHING OPERATIONS
4. EXAMPLE EMBODIMENT
5. COMPUTER NETWORKS AND CLOUD NETWORKS
6. MICROSERVICE APPLICATIONS
7. HARDWARE OVERVIEW

1. General Overview

One or more embodiments signal an event update to an event outbox via publication of a notification on a stream corresponding to a real-time streaming platform. The notification is received by an event publisher that subscribes to the stream. In response to the notification, the event publisher queries the event outbox for events that have not yet been published, obtains the events, and publishes the events.

One or more embodiments described in this Specification and/or recited in the claims may not be included in this General Overview section.

2. Transaction Publication Architecture

In certain embodiments, microservices architecture is an architectural style for building software applications as a collection of small, independent, and loosely coupled services. In the microservices architecture, an application may be decomposed into a set of smaller, self-contained services that can be developed, deployed, and scaled independently. In one embodiment, multi-tenant microservices interact with multiple databases or multiple schemas, while keeping tenant data isolated at rest in their individual transaction data stores.

Figure 1:
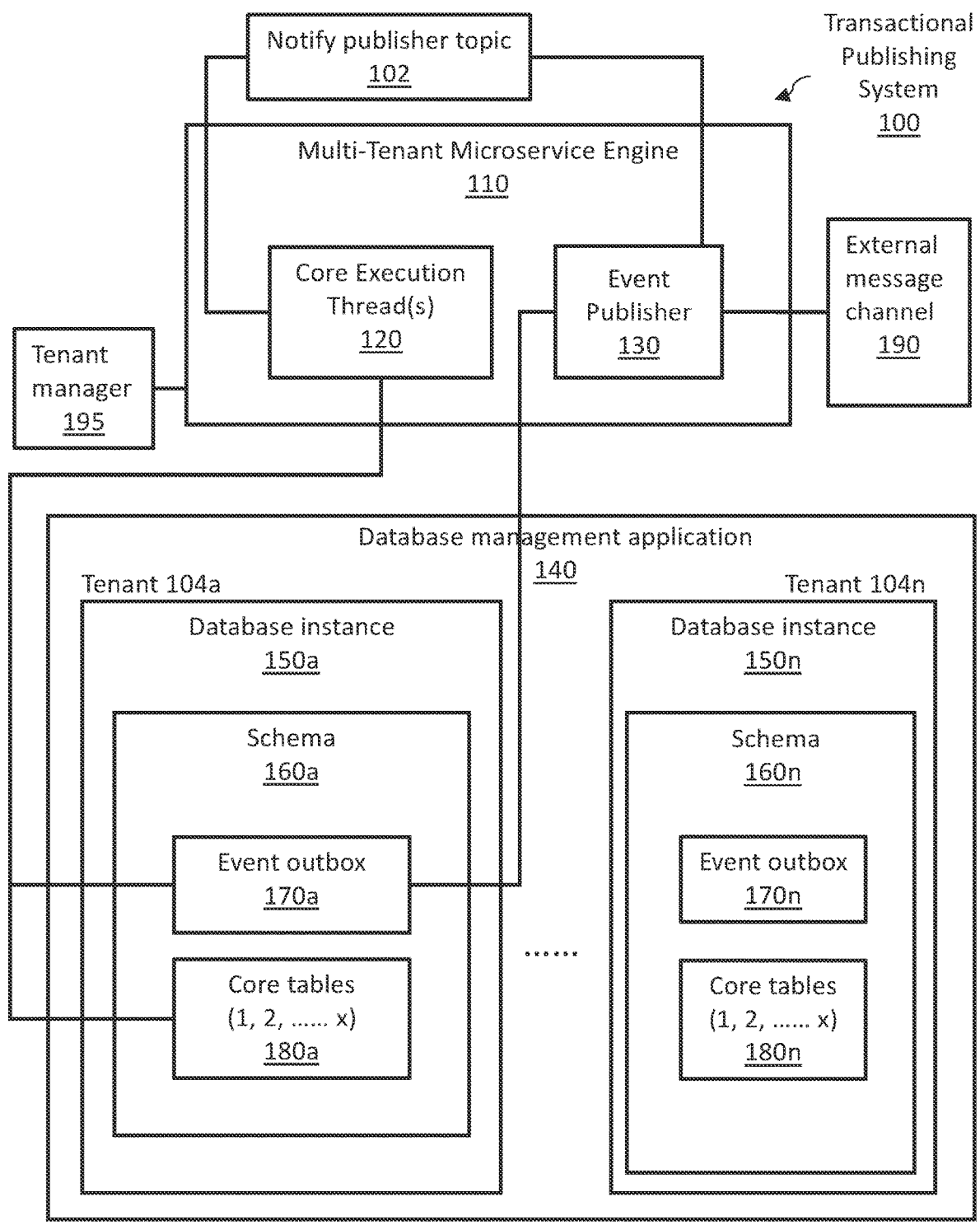
FIG. 1 illustrates an example of a transactional publishing system.

FIG. 1 illustrates an example of a multi-tenant transactional publishing system 100. The multi-tenant transactional publishing system 100 may include a multi-tenant microservice engine 110 and one or more database instances 150 (e.g., database instances 150a to 150n) managed by a database management application 140. Each of the database instances 150 may correspond respectively to tenants 104 (e.g., tenants 104a to 104n). Each database instance may be structured according to a corresponding schema (e.g., schema 160a to 160n). Furthermore, each database instance may be associated with an event outbox 170, and one or more core tables 180. Tenants 104 may be managed by the tenant manager 195, which may obtain and manage tenants' schema and database information. The core tables 180 may include a variety of values that can be added, modified and/or deleted. Further, the results of performing a microservice transaction may be logged to an event outbox 170 associated with a particular tenant 104.

A database instance (e.g., database instances 150a to 150n) refers to an executing copy of a database software system. A database instance represents the state of a database system at a particular point in time. The database instance actively stores and manages data. When a database management system (DBMS) is installed and initiated, the DBMS creates database instances. Each database instance includes the necessary system processes, memory structures, and background processes that enable the DBMS to function properly. The database instance provides the environment in which the database operates.

Multiple database instances can be created on a single physical server to support different databases or to provide better resource management. Each database instance may be independent and isolated from other instances, even if they are running on the same physical server. In a multi-tenant environment, a tenant's access to read and/or write data is restricted to database instances associated with that tenant. A database instance manages the physical storage of data, enforces data integrity and security, and provides access to the stored information. A database instance also handles concurrent access to the database, manages transactions, and performs various administrative tasks such as backup, recovery, and performance optimization.

A database schema (e.g., database schema 160a to 160n) refers to the logical structure or blueprint of a database. A database schema defines the organization, structure, and relationships of the data stored in the database. The database schema defines the tables, columns, data types, constraints, and relationships between the tables. A database schema provides a framework for organizing and representing the data in a consistent and meaningful way. The database schema defines the entities (e.g., core tables 180a) that hold the data and the attributes (columns) that describe the characteristics of those entities. The relationships between the entities are also defined in the schema, specifying how the tables are related to each other through primary keys, foreign keys, and other constraints.

For example, a database schema, for an e-commerce application, may include tables such as "Customers," "Products," and "Orders." The "Customers" table could have columns like "CustomerID," "Name," and "Email." The "Products" table might have columns like "ProductID," "Name," "Price," and so on. The database schema would also define the relationships, such as a foreign key in the "Orders" table referencing the "CustomerID" column in the "Customers" table. A database schema helps in ensuring data integrity, consistency, and efficient data retrieval. It acts as a blueprint for developers, administrators, and users to understand the structure and organization of the database. The database schema also plays a crucial role in enforcing security and access controls, as it defines the permissions and privileges granted to users or roles for accessing and modifying the data. A database can have multiple schemas, allowing for further logical organization and separation of data within the database. Schemas can be used to group related tables, views, procedures, and other database objects together.

In a multi-tenant database environment, a tenant (e.g., tenant 104a to tenant 104n) refers to a distinct entity or organization that may have its own database instance or share the same database instance with other tenants. Each tenant's data is logically segregated and isolated from other tenants, providing a level of data privacy and security. Tenants do not have direct access to or visibility into other tenants' data. The database architecture and access controls ensure that tenants can only access and manipulate their own data, maintaining data privacy and security.

In an example, a multi-tenant database is used by a software-as-a-service (SaaS) application. The SaaS provider hosts a single instance of the database, and multiple organizations or customers (tenants) use the application to store and manage their data. Each tenant's data is stored within the same database, but it is logically partitioned and secured to prevent unauthorized access. Multi-tenancy allows for efficient resource utilization, as multiple tenants can share the same infrastructure, software, and database instance while maintaining data separation. Multi-tenancy eliminates the need for separate database installations for each tenant, which can be costly and complex to manage. Within a multi-tenant database environment, tenant-specific data is typically distinguished by a unique identifier or key, such as a customer ID or a domain name. The database schema or tables may include additional columns or attributes to associate data with a specific tenant.

An event outbox (e.g., event outbox 170a to 170n) is a system component used in distributed systems to ensure reliable and asynchronous communication between services or components. When a system or service (e.g., the multi-tenant microservice engine 110) produces an event (such as a state change of a core table 180a in database instance 150a), the system or service writes the event to the event outbox, instead of directly sending the event to its intended consumers. The event outbox 170 acts as a persistent storage or queue that holds the events. Events may, optionally, be deleted from the event outbox 170 after they are processed by other components or services (e.g., the event publisher 130).

The event outbox provides several benefits:
  a. Decoupling: The event producer (e.g., core execution thread 120) and consumer (e.g., event publisher 130) are decoupled, allowing each to write to the event outbox 170 and read the event outbox 170 independently. The producer does not need to know the details of the consumers, and consumers can be added or modified without affecting the producer.
  b. Reliability: By persisting events in the event outbox 170, the core execution thread 120 ensures that events are not lost, even if there are network or service failures. The events can be reliably processed and accessed by the event publisher 130 at a later time.
  c. Scalability: The event outbox allows the core execution thread 120 to handle bursts of events efficiently. The core execution thread 120 can quickly write events to the event outbox 170, without waiting for the events to be consumed by the event publisher 130.

d. Asynchronous processing: The event outbox 170 enables asynchronous communication between the core execution thread 120 and the event publisher 130. The core execution thread 120 can quickly write events to the outbox and move on to a next operation, while the event publisher that is responsible for reading and processing the events can do so at a different rate.

Certain embodiments of the present application improve utilization and efficiency of the process of reading of the event outbox by assessing whether new events are stored in the event outbox. In one or more embodiments, updates to the event outbox 170 are paired with a notification to the event publisher 130. The notification informs the event publisher 130 of the existence of unpublished events in the event outbox 170. As a result, the event publisher 130 may query the event outbox 170, corresponding to the notification, for any unpublished events. Furthermore, the notification system, as described herein, reduces a delay between the time that an event is published to the event outbox 170 and a time at which the event publisher obtains the event from the event outbox 170.

An event, as referred to herein, is a representation of an occurrence of a condition or state change within a system 100. An event captures important information about what has happened and is usually used to notify or inform other components or services about the event. An event may, for example, correspond to an update of an object or record stored in a core table 180 of a database instance 150. Other examples of events include but are not limited to:

a. Domain Events: In event-driven architectures, domain events represent significant changes or actions within the business domain. For example, in an e-commerce system, domain events could include "OrderPlaced," "OrderShipped," or "ProductAddedToCart." These events capture important business actions and can trigger corresponding actions in other parts of the system.

b. System Events: System events capture noteworthy occurrences within the system itself. These events might include "ServiceStarted," "ServiceStopped," or "DatabaseConnectionError." System events can be used for monitoring, auditing, or triggering system-level processes.

c. Integration Events: In a distributed system, integration events are used for communication and coordination between different services. These events facilitate the exchange of information between services, enabling them to synchronize or react to changes. For example, an integration event could be "CustomerRegistered" or "InventoryUpdated," which other services can subscribe to and act upon.

d. Notifications: Events can also be used for sending notifications or alerts to interested parties. For instance, an event could represent a user registration event, a payment received event, or an error notification event.

Events stored in the event outbox typically include relevant data about the event, such as identifiers, timestamps, and any additional payload necessary for the consumer to process the event correctly. The events are often represented in a structured format, such as JSON or a custom event schema, allowing for easy serialization and deserialization.

Events stored in an event outbox depend on the requirements and design of the system. The types of events can be tailored to the specific business domain and the communication needs between different components or services within the system.

In one embodiment, events created as part of a core micro-service transaction are committed to the event outbox 170 in an atomic transaction that includes an update to a core table 180 of the database instance 150. The use of an atomic transaction, including the updates to both the core table 180 and the event outbox 170, ensures that there are no events recorded for an incomplete or rolled-back transaction corresponding to the core tables 180. Events are not lost when the core transaction commits.

The multi-tenant microservice engine 110 may further include one or more core execution threads 120 of the core execution engine. The core execution engine may execute commands for updating the database instance 150. A core execution thread 120 refers to an individual thread of execution that runs on a processor core within a computer system. Each processor core is capable of executing multiple threads simultaneously through hardware-level concurrency. A system, with multiple processor cores, allows for parallel execution of multiple threads. Each processor core runs one or more threads concurrently, depending on the underlying architecture and operating system. The core execution thread represents an independent sequence of instructions that can be scheduled and executed on a specific processor core. These threads share the resources of the processor core, such as registers, cache, and execution units, and can perform computational tasks in parallel.

The event publisher 130 is a component or service that publishes events within an event-driven architecture. The event publisher is responsible for publishing events and making them available for other components or services to consume and react to. The primary function of an event publisher is to identify significant occurrences or changes within a system and publish corresponding events. The event publisher may publish events to a central event bus, message queue, or event store, from where the events can be distributed to interested subscribers or consumers.

The responsibilities of an event publisher may include, for example:

a. Event Generation: An event publisher generates events based on predefined triggers, such as a user action, system event, or business rule. It identifies when an event should be emitted and prepares the event with relevant data or payload.

b. Event Publication: Once an event is generated, the publisher publishes it to an appropriate channel or event store. This could be a message broker, event bus, database, or any other mechanism that allows events to be made available for consumption.

c. Event Metadata: Event publishers often include metadata with the events, providing additional context or information about the event. This metadata can include timestamps, event identifiers, source information, or any other relevant details.

d. Event Versioning: In some cases, event publishers may handle event versioning. As the system evolves, the structure or payload of events may change. Publishers may ensure backward compatibility by including versioning information in the event, allowing subscribers to handle different event versions appropriately.

e. Event Validation: Event publishers may perform validation on the generated events to ensure they adhere to specific rules or constraints. This validation can include data consistency checks, ensuring required fields are present, or enforcing any other business-specific validation rules.

Returning to FIG. 1, the core execution thread 120 publishes a notification to the internal notify publisher topic 102 when the event outbox 170 is updated. The microservice engine 110 may use a transaction post commit listener to dispatch a "notify" message after each successful transaction against any tenant schema and database. In response to receiving the notification, the event publisher 130 queries the event outbox 170 for unpublished events. Upon receiving one or more unpublished events from the event outbox 170, the event publisher publishes the unpublished events.

In an embodiment, the notification published to the notify publisher topic 102 may include the tenant id corresponding to the database instance 150 that was updated. The notification may be published to the notify publisher topic 102 with tenant id set as a partition key for a stream partition. This ensures that only one event publisher 130 that processes data from that stream partition processes the notification. Once the event publisher receives the tenant id, the event publisher maps the tenant id to the event outbox that is to be queried for unpublished events. In one embodiment, a single notification is published per transaction. Accordingly, even if a transaction produces multiple events, a single notification message is published to the notify publisher topic 102.

The notification may be published to the notify publisher topic 102 instead of a local in memory queue to enforce a single one event publisher 130 across a cluster responsible for publishing events for a given tenant 104. Using a single event publisher helps in ensuring that events are published in the order in which they are recorded in the database instance 150. In order to recover from any occasional notify command publishing failures due to internal failures, a periodic check (done in intervals such as 30 mins or higher) may be performed on each tenant schema 160, if the microservice engine 110 determines that there are events pending (for more than certain threshold time) in the event outbox 170. And, if required, a notify command may be published to the notify publisher topic 102. In such an instance, once the notify command is received by the event publisher 130, the microservice engine 110 performs the rest of the processing.

In another embodiment, the event publisher 130 may read the pending events from the tenant's event outbox 170 and publish them to an appropriate external message channel 190. The publishing of the events in the outbox 170 may be performed in the same order as they are read. Once successfully published, the records in the event outbox 170 can be deleted or marked as published. This approach allows for the "at-least-once" semantics for event delivery. The events consumers may receive duplicate events in some cases and need to be able to handle duplicate events. In one embodiment, an event may contain an event id, which can be used by consumers to identify duplicate events.

In one embodiment, the event publisher threads across different replica pods of the micro-service engine 110 handle the event publishing for different tenants 104 in parallel. Events of a specific tenant 104 may be handled by only one publisher thread. This technique ensures publishing events in order and avoids race conditions.

During event publishing to a process events topic in a distributed cluster (not illustrated), events for any given tenant 104 may be published by one of the nodes. In this manner, the sequence of the events may be maintained, and the events can be published in the same order as they were recorded in events outbox 170. Moreover, lock exceptions can be created when two or more publisher threads attempt to update the same event recorded as processed.

One embodiment leverages an internal messaging platform, such as Apache Kafka, for example, to elect an event publisher 130 for a tenant 104 via partition assignment. After writing to event outbox 170, the microservice 110 may publish a message that includes a tenant id to the notify publisher topic 102. The message may be published with a key being equal to tenant id to ensure that only one event publisher model thread handles the tenant's events at any given point in time.

In another embodiment, the event publisher 130 may modify the event outbox to mark events as published. Additionally, the event publisher 130 can be configured to purge any unpublished events older than a predetermined time period such as 30 days, for example. Specifically, where pod crashes after writing the record to the tables 180 but before publishing the notify message, when the event publisher 130 is notified next (as a result of another core execution transaction), the event publisher 130 may pull the pending messages, up to a max batch size from the tables 180. In one embodiment, if additional records pending in event outbox 170 are detected, the event publisher 130 may enqueue another command message in the notify publisher topic 102 for the tenant 104. Within the function of periodic auto recovery performed for each tenant 104, a message may then be published to the notify publisher topic 102, which resolves occasional instances of stranded unpublished events.

3. Multi-Tenant Transactional Publishing Operations

Figure 2:
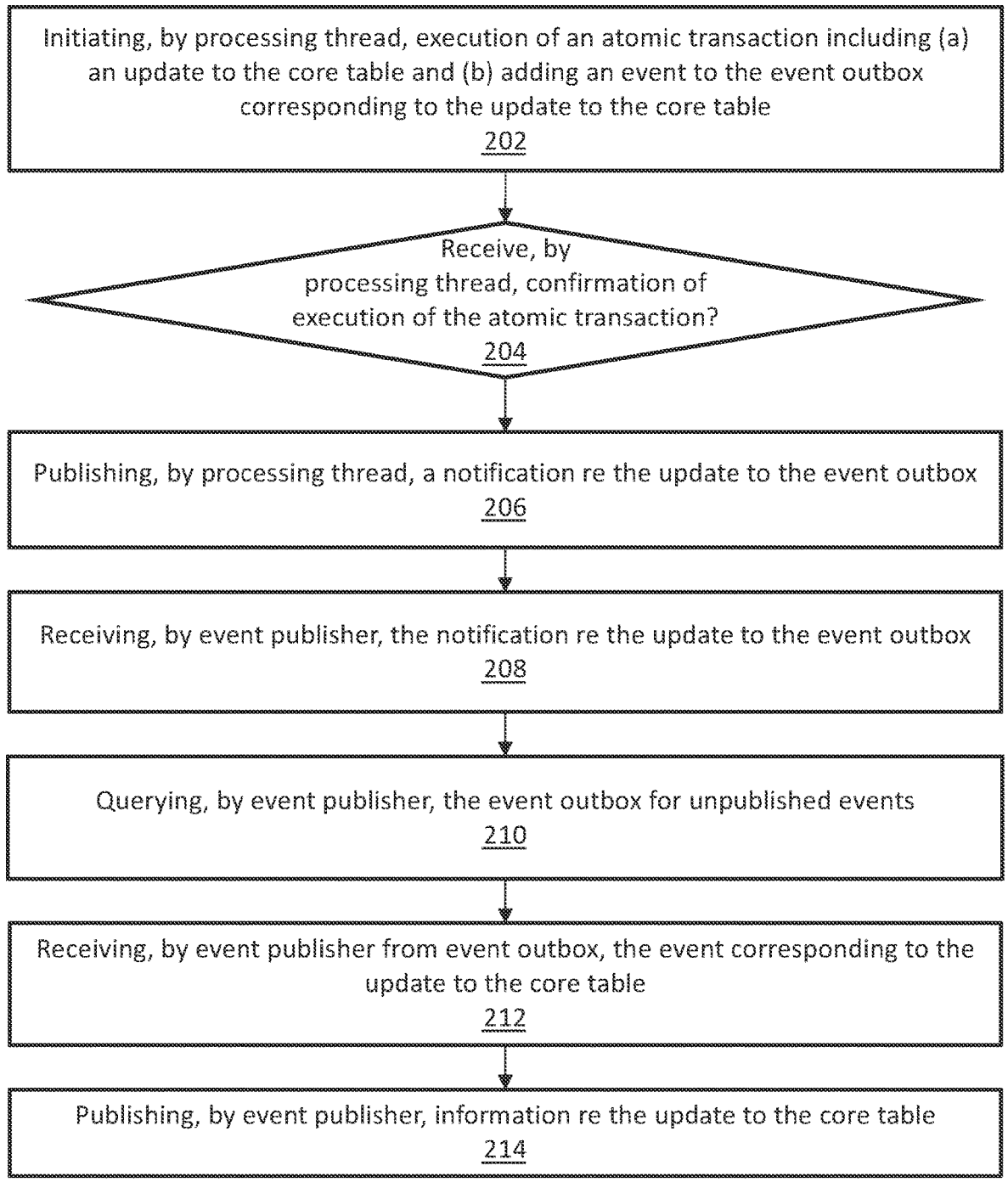
FIG. 2 illustrates an example of steps of a transactional publishing system operation.

FIG. 2 illustrates one or more operations for transactional publishing operation. In step 202, the core execution thread 120 may initiate execution of an atomic transaction for the microservice engine 110 for a tenant 104. The core execution thread 120 may transmit a command to a database management application 140 to execute the command. The atomic transaction may include (a) executing a database transaction by adding, modifying, or deleting a value in a database instance 150 and (b) logging information corresponding to the database transaction to an event outbox 170 associated with the tenant 104.

In one embodiment, an atomic transaction (a transaction with the atomicity property) ensures that if the executed transaction consists of multiple operations, either all the operations are successfully completed, and the transaction is committed, or none of the operations take effect, and the transaction is rolled back to its original state. In other words, the atomic transaction guarantees that all or none of the changes made by the transaction are applied to the database instance 150.

In another embodiment, the database instance 150 remains in a consistent state before and after the transaction, i.e. integrity constraints or rules defined in the database schema 160 are not violated. Each transaction may be executed in isolation from other concurrent transactions. Intermediate states of a transaction may be visible to other transactions until the atomic transaction is committed. In another embodiment, once the transaction is committed, its changes are permanent and will survive any subsequent system failures or crashes.

In step 204, the core execution thread 120 of the multi-tenant microservice engine 110 receives a confirmation of execution of the atomic transaction as a result of the database management application 140 executing the transmitted command.

The requirement of receiving the confirmation of the execution of the transaction may be particularly valuable to reducing the overhead of the system because the polling of the events from an outbox table that has no events to publish may no longer be necessary. In other words, if the core execution thread 120 receives no confirmation, further processing of the transactional publishing operations may cease at that stage.

In step 206, the core execution thread 120 may publish a notification corresponding to the execution of the atomic transaction in response to receiving the confirmation of the execution of the atomic transaction. The notification may include information that can be used to identify the event outbox 170 storing the information corresponding to the database transaction, such as for example a tenant id. This ensures that only one consumer thread in the cluster consumes messages for a specific tenant 104 at any given point in time, and thereby provides isolation of tenants' schema 160 from one another.

In step 208, the event publisher 130 of a particular specific tenant schema 160 may receive the notification corresponding to the execution of the atomic transaction. In other words, the event publisher 130 may receive a message pertaining to one tenant 104 and no other tenant.

The requirement for the event publisher 130 to receive the notification corresponding to the execution of the atomic transaction may further optimize the processing of the multi-tenant microservice engine 110. Namely, this step may eliminate a need for multiple message relays to be created for multiple onboarding tenants, to poll event outboxes regardless of whether there is a change in the core tables, and irrespective of instances when no event has occurred.

Next, in step 210, the now notified event publisher 130 may take action based on the received notification. In one embodiment, the event publisher 130 may query the event outbox 170 seeking confirmed unpublished information, such as the events in the outbox 170 that have occurred as a result of the core execution thread 120 executing the atomic transaction and modifying the core tables 180.

In step 212, the event publisher 130 may retrieve the new, unpublished events available in the event outbox 170. The event publisher 130 may receive the results of the executed query, which requests events associated with a tenant id so that the received events belong to the schema 160 of the particular tenant 104, and no other tenant 104.

Lastly, in step 214, the event publisher 130 may convey the unpublished events for a particular tenant 104 to the external message channel 190 outside of the multi-tenant microservice engine 110, and the events may be published externally. At this stage, the event publisher 130 may delete or mark in the event outbox 170 the already published events for the future reference.

4. Example Embodiment

FIGS. 3A-3D illustrate an example embodiment of the transactional publishing system. For illustration purposes, the example embodiment corresponds to an ordering system in which an order entry system receives and processes new orders. The new orders are published to order fulfillers.

The order table 302A is a core table maintained by a database management application in a database instance. The order table 302A stores orders for a tenant with access to the database management application. The order table 302A is updated as new orders are recorded by the tenant. In this example, the order table 302A includes an order ID, ordered item(s), a quantity of the ordered items, a cost per item, and a total cost.

The event outbox 304A stores events that are related to updates to core tables such as the order table 302A. For example, the event outbox 304A stores events corresponding to the addition of new orders to the order table 302A. Events stored in the event outbox 304A are stored with a corresponding event ID. The stored events indicate an event target and an event description.

Publisher notifications 306 are notifications transmitted by a core execution thread, of a multi-tenant microservice engine, to an event publisher to notify the event publisher of new events in the event outbox. The notifications cause the event publisher to access the event outbox 304A for events to be processed by the event publisher. When the tenant's customer places an order, the tenant submits the order to the database management system. A core execution thread of the multi-tenant microservice engine simultaneously updates the order table 302A and the event outbox 304A using an atomic transaction. Upon confirmation of successful execution of the atomic transaction, the core execution thread notifies the event publisher of new events being stored in the event outbox 304A.

External publication 308 is a publication by an event publisher that corresponds to the events in the event outbox 304A. The event publisher may publish events, for example, via an Apache Kafka platform. Apache Kafka is an external publication 308 platform that includes Kafka Streams application. The Kafka Streams is an example of a library that consumes data from Kafka topics, processes the data, and produces results back to Kafka topics. The event publisher may publish events on an "Orders" topic. An order fulfiller may receive the events published by the event publisher.

In the illustrated example, FIGS. 3A-3D are chronologically ordered to correspond to moments in time T1-T4, respectively. FIG. 3A shows a stage at time T1 prior to an order 234 being submitted by a tenant to the database management application. Accordingly, order table 302A and event outbox 304A in the tenant's database instance do not yet include information related to the order 234.

Next, the tenant records an order 234 placed by the tenant's customer. The tenant submits, to the database management application, the order 234 for (2) widgets that cost $10 each. Responsive to receiving the order, a core execution thread of the multi-tenant microservice engine updates both the order table 302A and 304A using an atomic transaction at time T2, as illustrated in FIG. 3B. Since the updates are performed using an atomic transaction, the new event is logged in the event outbox 304A simultaneously with the order table 302A being updated. The use of the atomic transaction ensures that there are no events recorded for an incomplete or rolled-back transaction corresponding to the table 302A. The table 302A is updated to reflect order 234 for two widgets that cost $10 each, amounting to the total cost of $20. Simultaneously, the outbox 304A logs the event that occurred. In the outbox 304A, the entered event ID number is 12, the target of the order is the order table 302A, and the event is described in the outbox 304A as "order added."

In response to determining that the atomic transaction, updating the order table 302A and the event outbox 304A, was successfully executed, a core execution thread of the multi-tenant microservice engine transmits a publisher notification 306 at time T3, as illustrated in FIG. 3C. The core execution thread transmits the publisher notification 306 to an event publisher. The publisher notification 306 indicates that the event outbox 304A has a new event. Sending the publisher notification 306 to inform the event publisher advantageously removes the need of the event publisher notification 306 to periodically poll the event outbox 304A for new events. Furthermore, the publisher notification 306 may be sent by the core execution thread immediately upon receiving confirmation of the successful execution of the atomic transaction, in order to reduce a latency between time that the event outbox 304A is updated and the event publisher is notified of the update.

In response to receiving the notification, the event publisher queries the event outbox 304A for unpublished events and finds the new event corresponding to event ID 12. Upon retrieving the new event from the outbox 304A, the event publisher may verify that the new event corresponds to the information entered into the order table 302A. Subsequent to the confirmation, the event publisher generates an external publication 308 corresponding to order 234 at time T4, as illustrated in FIG. 3D. The external publication indicates "new order 234 has been generated." The event publisher may mark the event record in the event outbox 304A as published/processed, or delete the event record from the event outbox 304A. An order fulfiller receives the external publication 308 and takes steps to fulfill the order.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In some embodiments, the trigger, when satisfied, might output data for consumption by the target microservice. In other embodiments, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
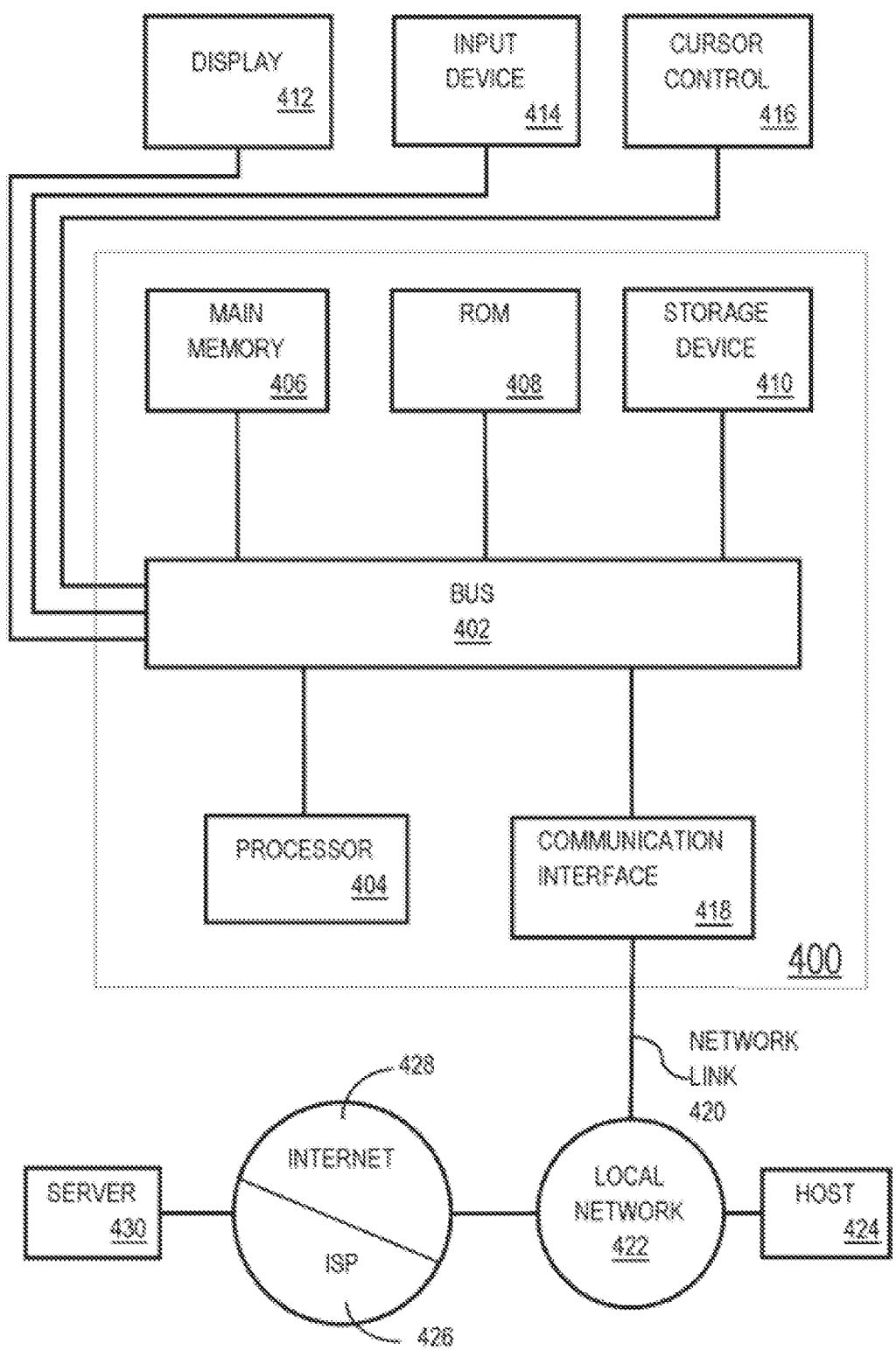
FIG. 4 illustrates a block diagram of a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    initiating, by a particular processing thread for a particular microservice for a particular tenant, execution of an atomic transaction, the atomic transaction comprising (a) executing a database transaction by adding, modifying, or deleting a value in a database instance and (b) logging, to an event outbox associated with the particular tenant, information corresponding to the database transaction;
    receiving, by the particular processing thread, confirmation of execution of the atomic transaction;
    responsive to receiving the confirmation of the execution of the atomic transaction, publishing, by the particular processing thread in a particular stream partition, a notification corresponding to the execution of the atomic transaction, wherein the notification comprises information that can be used to identify the event outbox storing the information corresponding to the database transaction;
    receiving, by an event publisher subscribed to the particular stream partition, the notification corresponding to the execution of the atomic transaction;
    responsive to the event publisher receiving the notification, corresponding to the execution of the atomic transaction, via the particular stream partition that is subscribed to by the event publisher:
        retrieving, by the event publisher from the event outbox, the information corresponding to the database transaction; and
    publishing, by the event publisher, an event based on the information corresponding to the database transaction.

2. The media of claim 1, wherein the event publisher refrains from executing any periodic polling of the event outbox.

3. The media of claim 1, wherein the particular processing thread publishes the notification immediately in response to receiving the confirmation of the execution of the atomic transaction.

4. The media of claim 1, wherein retrieving, by the event publisher from the event outbox, the information corresponding to the database transaction comprises:
    executing, by the event publisher, a query for events in the event outbox that have not been processed by the event publisher.

5. The media of claim 1, wherein the event publisher is implemented by the particular microservice for the particular tenant.

6. The media of claim 1, wherein subsequent to the event publisher retrieving the information from the event outbox, the operations further comprise at least one of:
marking the information in the event outbox as processed; or
deleting the information in the event outbox.

7. The media of claim 1, wherein the event outbox is a tenant-specific event outbox logging information corresponding to database transactions for a single tenant.

8. The media of claim 1, wherein the notification comprises a first identifier corresponding to the particular tenant and a second identifier corresponding to the particular microservice, wherein the event publisher identifies the event outbox based on the first identifier and the second identifier.

9. A method comprising:
initiating, by a particular processing thread for a particular microservice for a particular tenant, execution of an atomic transaction, the atomic transaction comprising (a) executing a database transaction by adding, modifying, or deleting a value in a database instance and (b) logging, to an event outbox associated with the particular tenant, information corresponding to the database transaction;
receiving, by the particular processing thread, confirmation of execution of the atomic transaction;
responsive to receiving the confirmation of the execution of the atomic transaction, publishing, by the particular processing thread in a particular stream partition, a notification corresponding to the execution of the atomic transaction, wherein the notification comprises information that can be used to identify the event outbox storing the information corresponding to the database transaction;
receiving, by an event publisher subscribed to the particular stream partition, the notification corresponding to the execution of the atomic transaction;
responsive to the event publisher receiving the notification, corresponding to the execution of the atomic transaction, via the particular stream partition that is subscribed to by the event publisher:
retrieving, by the event publisher from the event outbox, the information corresponding to the database transaction; and
publishing, by the event publisher, an event based on the information corresponding to the database transaction, wherein the method is executed by at least one device including a hardware processor.

10. The method of claim 9, wherein the event publisher refrains from executing any periodic polling of the event outbox.

11. The method of claim 9, wherein the particular processing thread publishes the notification immediately in response to receiving the confirmation of the execution of the atomic transaction.

12. The method of claim 9, wherein retrieving, by the event publisher from the event outbox, the information corresponding to the database transaction comprises:
executing, by the event publisher, a query for events in the event outbox that have not been processed by the event publisher.

13. The method of claim 9, wherein the event publisher is implemented by the particular microservice for the particular tenant.

14. The method of claim 9, wherein subsequent to the event publisher retrieving the information from the event outbox, the method further comprise at least one of:
marking the information in the event outbox as processed; or
deleting the information in the event outbox.

15. The method of claim 9, wherein the event outbox is a tenant-specific event outbox logging information corresponding to database transactions for a single tenant.

16. The method of claim 9, wherein the notification comprises a first identifier corresponding to the particular tenant and a second identifier corresponding to the particular microservice, wherein the event publisher identifies the event outbox based on the first identifier and the second identifier.

17. A system comprising:
at least one device including a hardware processor;
the system being configured to perform operations comprising:
initiating, by a particular processing thread for a particular microservice for a particular tenant, execution of an atomic transaction, the atomic transaction comprising (a) executing a database transaction by adding, modifying, or deleting a value in a database instance and (b) logging, to an event outbox associated with the particular tenant, information corresponding to the database transaction;
receiving, by the particular processing thread, confirmation of execution of the atomic transaction;
responsive to receiving the confirmation of the execution of the atomic transaction, publishing, by the particular processing thread in a particular stream partition, a notification corresponding to the execution of the atomic transaction, wherein the notification comprises information that can be used to identify the event outbox storing the information corresponding to the database transaction;
receiving, by an event publisher subscribed to the particular stream partition, the notification corresponding to the execution of the atomic transaction;
responsive to the event publisher receiving the notification, corresponding to the execution of the atomic transaction, via the particular stream partition that is subscribed to by the event publisher:
retrieving, by the event publisher from the event outbox, the information corresponding to the database transaction; and
publishing, by the event publisher, an event based on the information corresponding to the database transaction.

18. The system of claim 17, wherein the event publisher refrains from executing any periodic polling of the event outbox.

* * * * *